US012440799B2

(12) United States Patent
Lefebvre et al.

(10) Patent No.: US 12,440,799 B2
(45) Date of Patent: Oct. 14, 2025

(54) POST-COMBUSTION CO2 CAPTURE WITH HEAT RECOVERY AND INTEGRATION

(71) Applicant: SAIPEM S.P.A., San Donato (IT)

(72) Inventors: Sylvain Lefebvre, Saint-Gebriel-de-Valcartier (CA); Ferrere Clerveaux, Québec (CA)

(73) Assignee: Saipem S.P.A., Milan (IT)

( * ) Notice: Subject to any disclaimer, the term of this patent is extended or adjusted under 35 U.S.C. 154(b) by 0 days.

(21) Appl. No.: 16/972,107

(22) PCT Filed: Jun. 5, 2019

(86) PCT No.: PCT/CA2019/050781
§ 371 (c)(1),
(2) Date: Dec. 4, 2020

(87) PCT Pub. No.: WO2019/232626
PCT Pub. Date: Dec. 12, 2019

(65) Prior Publication Data
US 2021/0220771 A1    Jul. 22, 2021

Related U.S. Application Data

(60) Provisional application No. 62/681,363, filed on Jun. 6, 2018.

(51) Int. Cl.
*B01D 53/14* (2006.01)
*B01D 53/26* (2006.01)
(Continued)

(52) U.S. Cl.
CPC ..... *B01D 53/1475* (2013.01); *B01D 53/1425* (2013.01); *B01D 53/265* (2013.01);
(Continued)

(58) Field of Classification Search
CPC ............ B01D 53/1475; B01D 53/1425; B01D 53/265; B01D 53/343; B01D 53/346;
(Continued)

(56) References Cited

U.S. PATENT DOCUMENTS 8,500,891 B2    8/2013   Butler et al.
2008/0317651 A1*  12/2008  Hooper .............. B01D 53/1475
                                                       423/230

(Continued)

FOREIGN PATENT DOCUMENTS

EP        3006099 B1    8/2018

OTHER PUBLICATIONS

International Search Report for International Patent Application No. PCT/CA2019/050781, mailed Aug. 20, 2019, 2 pages.

*Primary Examiner* — Anita Nassiri-Motlagh
(74) *Attorney, Agent, or Firm* — Armstrong Teasdale LLP

(57) ABSTRACT

$CO_2$ capture processes and systems can be improved by recovering thermal energy from particular streams for reuse in the stripping stage. Thermal energy can be recovered from the overhead gas stream of a stripper operated under vacuum pressure conditions, and thermal energy can also be recovered from a flue gas. A heat transfer circuit can be implemented for recovering thermal energy by indirect heat transfer from the overhead gas stream, a flue gas stream, and/or other streams to a heat transfer fluid. The heat transfer circuit can include multiple heat recovery loops arranged in parallel and the heated fluid can be supplied through a reboiler of the stripper to heat the solution in the reboiler.

14 Claims, 10 Drawing Sheets

(51) Int. Cl.
*B01D 53/34* (2006.01)
*B01D 53/62* (2006.01)
*B01D 53/78* (2006.01)
*B01D 53/96* (2006.01)
*F28D 7/00* (2006.01)

(52) U.S. Cl.
CPC ......... *B01D 53/343* (2013.01); *B01D 53/346* (2013.01); *B01D 53/62* (2013.01); *B01D 53/78* (2013.01); *B01D 53/96* (2013.01); *F28D 7/0066* (2013.01); *B01D 2251/306* (2013.01); *B01D 2251/606* (2013.01); *B01D 2252/103* (2013.01); *B01D 2252/20405* (2013.01); *B01D 2252/20484* (2013.01); *B01D 2252/602* (2013.01); *B01D 2257/504* (2013.01); *B01D 2258/0283* (2013.01)

(58) Field of Classification Search
CPC ........ B01D 53/62; B01D 53/78; B01D 53/96; B01D 2251/306; B01D 2251/606; B01D 2252/103; B01D 2252/20405; B01D 2252/20484; B01D 2252/602; B01D 2257/504; B01D 2258/0283; F28D 7/0066
USPC .......................................................... 423/232
See application file for complete search history.

(56) References Cited

U.S. PATENT DOCUMENTS

| | | | |
|---|---|---|---|
| 2012/0129246 A1* | 5/2012 | Fradette | B01D 53/1425 252/190 |
| 2013/0153400 A1* | 6/2013 | Hume | B01D 53/1475 202/180 |
| 2013/0312386 A1 | 11/2013 | Wirsum et al. | |
| 2014/0106440 A1* | 4/2014 | Penders | B01D 53/1493 435/294.1 |
| 2015/0231561 A1* | 8/2015 | Reardon | B01D 53/84 435/266 |

* cited by examiner

POST-COMBUSTION CO2 CAPTURE WITH HEAT RECOVERY AND INTEGRATION

CROSS-REFERENCE TO RELATED APPLICATIONS

This application is a National Stage Application of International Patent Application No. PCT/CA2019/050781, filed Jun. 5, 2019, which claims the benefit of priority to U.S. Provisional Patent Application No. 62/681,363, filed Jun. 6, 2018, each of which is hereby incorporated by reference in its entirety.

TECHNICAL FIELD

The technical field generally relates to post-combustion $CO_2$ capture, and more particularly in the context of $CO_2$ capture operations using non-carbamate forming absorption solutions such as potassium carbonate.

BACKGROUND

Post-combustion $CO_2$ capture technologies based on the use of absorption and desorption units conventionally necessitate heat from the host facility where they are implemented, to conduct the regeneration of the absorption solution in the desorption or stripper unit. This heat or thermal energy, for most of the conventional $CO_2$ capture technologies, such as those based on amines, is provided as steam which is a high-quality thermal energy source since solution regeneration is performed under pressure and at temperatures over 100° C. Depending on the implementation sites and the industrial sectors, the use of this high-quality thermal energy can result in a high energy penalty on the host facility and limit broad adoption of $CO_2$ capture operations. This applies similarly to post-combustion technologies based on the use of amino-acids solutions and/or potassium-based solution using an activator for which the stripper is operated at a temperature above atmospheric and at a temperature higher than 100° C. There is thus a need to provide enhanced technologies that can overcome at least some of the drawback of known methods.

SUMMARY $CO_2$ capture processes and systems can be improved by recovering thermal energy from particular streams for reuse in the stripping stage. In some implementations, thermal energy is recovered from the overhead gas stream of a stripper operated under vacuum pressure conditions. Thermal energy can also be recovered from a flue gas. A heat transfer circuit can be implemented for recovering thermal energy by indirect heat transfer from the overhead gas stream, a flue gas stream, and/or other streams to a heat transfer fluid. The heat transfer circuit can include multiple heat recovery loops arranged in parallel and the heated fluid can be supplied through a reboiler of the stripper to heat the solution in the reboiler.

When recovering heat from the overhead gas stream or a gas stream derived therefrom, it can be advantageous to use one or more compression stages to increase the temperature of the gas stream and facilitate temperature gradients for transferring thermal energy to the heat transfer fluid.

In some implementations, there is provided a $CO_2$ capture process for capturing $CO_2$ from flue gas generated by a host facility, the process comprising: in an absorption stage, directly contacting a flue gas stream with an absorption solution comprising water and a non-carbamate forming absorption compound to absorb $CO_2$ and form a $CO_2$-rich solution and a $CO_2$ depleted gas; in a stripping stage, subjecting the $CO_2$-rich solution to vacuum pressure conditions and temperature conditions below 100° C. to cause the release of $CO_2$ from the $CO_2$-rich solution to form a regenerated solution and an overhead gas stream comprising $CO_2$ and steam; recycling the regenerated solution back into the absorption stage as at least part of the absorption solution; and subjecting the overhead gas stream to heat recovery. The heat recovery can include compressing the overhead gas stream or a gas stream derived therefrom to increase a temperature thereof and produce a compressed gas stream; transferring heat from the compressed gas stream to a heat transfer fluid to form a heated fluid; and transferring heat from the heated fluid to the stripping stage.

In some implementations, there is provided a $CO_2$ capture system for capturing $CO_2$ from flue gas generated by a host facility, the $CO_2$ capture system comprising: an absorption stage comprising an absorber configured to receive and enable direct contact of a flue gas stream with an absorption solution comprising water and a non-carbamate forming absorption compound to absorb $CO_2$ and form a $CO_2$-rich solution and a $CO_2$ depleted gas; a stripping stage comprising a reboiler and a vacuum stripper configured for receiving and subjecting the $CO_2$-rich solution to vacuum pressure conditions and temperature conditions below 100° C. to cause release of $CO_2$ from the $CO_2$-rich solution to form a regenerated solution and an overhead gas stream comprising $CO_2$ and water vapour; and an overhead heat recovery assembly. The overhead heat recovery assembly can include a compressor configured to receive and compress the overhead gas stream or a gas stream derived therefrom to increase temperature thereof and produce a compressed gas stream; a heat exchanger in fluid communication with the compressor and configured to transferring heat from the compressed gas stream to a heat transfer fluid to form a heated fluid; and an overhead recovery loop configured to circulate the heat transfer fluid through the heat exchanger to increase a temperature thereof and then through the reboiler of the stripper to transfer thermal energy to the reboiler.

In some implementations, there is provided a heat integration system for heat recovery and reuse in a $CO_2$ capture operation employing an absorber and a vacuum stripper operated at vacuum pressure conditions and temperatures below 100° C., the heat integration system comprising at least one compressor configured to receive and compress an overhead gas stream produced by the vacuum stripper or a gas stream derived therefrom to increase temperature thereof and produce a compressed gas stream; at least one heat exchanger each being in fluid communication with a corresponding compressor and configured to transfer thermal energy from the compressed gas stream to a heat transfer fluid to form a heated fluid; and an overhead recovery loop configured to circulate the heat transfer fluid through the heat exchanger to form the heated fluid and through a reboiler of the vacuum stripper to transfer thermal energy to a solution in the reboiler.

In some implementations, there is provided a heat integration method for heat recovery and integration in a $CO_2$ capture operation employing an absorber and a vacuum stripper operated at vacuum pressure conditions and temperatures below 100° C., the heat integration method comprising compressing an overhead gas stream generated by the vacuum stripper or a gas stream derived therefrom to increase temperature thereof and produce a compressed gas stream; transferring heat from the compressed gas stream to a heat transfer fluid to form a heated fluid; and transferring heat from the heated fluid to the vacuum stripper.

In some implementations, there is provided a $CO_2$ capture process for capturing $CO_2$ from flue gas generated by a host facility, the process comprising: in an absorption stage, directly contacting a flue gas stream with an absorption solution comprising water and a non-carbamate forming absorption compound to absorb $CO_2$ and form a $CO_2$-rich solution and a $CO_2$ depleted gas; in a stripping stage, subjecting the $CO_2$-rich solution to vacuum pressure conditions and temperature conditions below 100° C. to cause release of $CO_2$ from the $CO_2$-rich solution to form a regenerated solution and an overhead gas stream comprising $CO_2$ and steam; recycling the regenerated solution back into the absorption stage as at least part of the absorption solution; and subjecting the overhead gas stream to heat recovery. The heat recovery can include cooling the overhead gas stream to produce a cooled overhead gas stream and a condensate stream; recycling the condensate stream back into the process; compressing the cooled overhead gas stream to increase a temperature thereof and produce a compressed gas stream; transferring heat from the compressed gas stream to a heat transfer fluid to form a heated fluid; and transferring heat from the heated fluid to the stripping stage.

In some implementations, there is provided a $CO_2$ capture process for capturing $CO_2$ from flue gas generated by a host facility, the process comprising: in an absorption stage, directly contacting a flue gas stream with an absorption solution comprising water and a non-carbamate forming absorption compound to absorb $CO_2$ and form a $CO_2$-rich solution and a $CO_2$ depleted gas; in a stripping stage, subjecting the $CO_2$-rich solution to vacuum pressure conditions and temperature conditions below 100° C. to cause release of $CO_2$ from the $CO_2$-rich solution to form a regenerated solution and an overhead gas stream comprising $CO_2$ and steam; recycling the regenerated solution back into the absorption stage as at least part of the absorption solution; subjecting the overhead gas stream to heat recovery, which includes compressing the overhead gas stream directly after release from the stripping stage to increase a temperature thereof and produce a compressed gas stream; transferring heat from the compressed gas stream to a heat transfer fluid and forming a cooled gas stream; compressing the cooled gas stream to increase a temperature thereof and produce a further compressed gas stream; transferring heat from the further compressed gas stream to the heat transfer fluid; and transferring heat from the heated heat transfer fluid to the stripping stage.

Further optional features, aspects and implementations of the heat integration techniques are described in the present description. A number of variations and features can be implemented in the context of these processes and systems.

DETAILED DESCRIPTION

Figure 1:
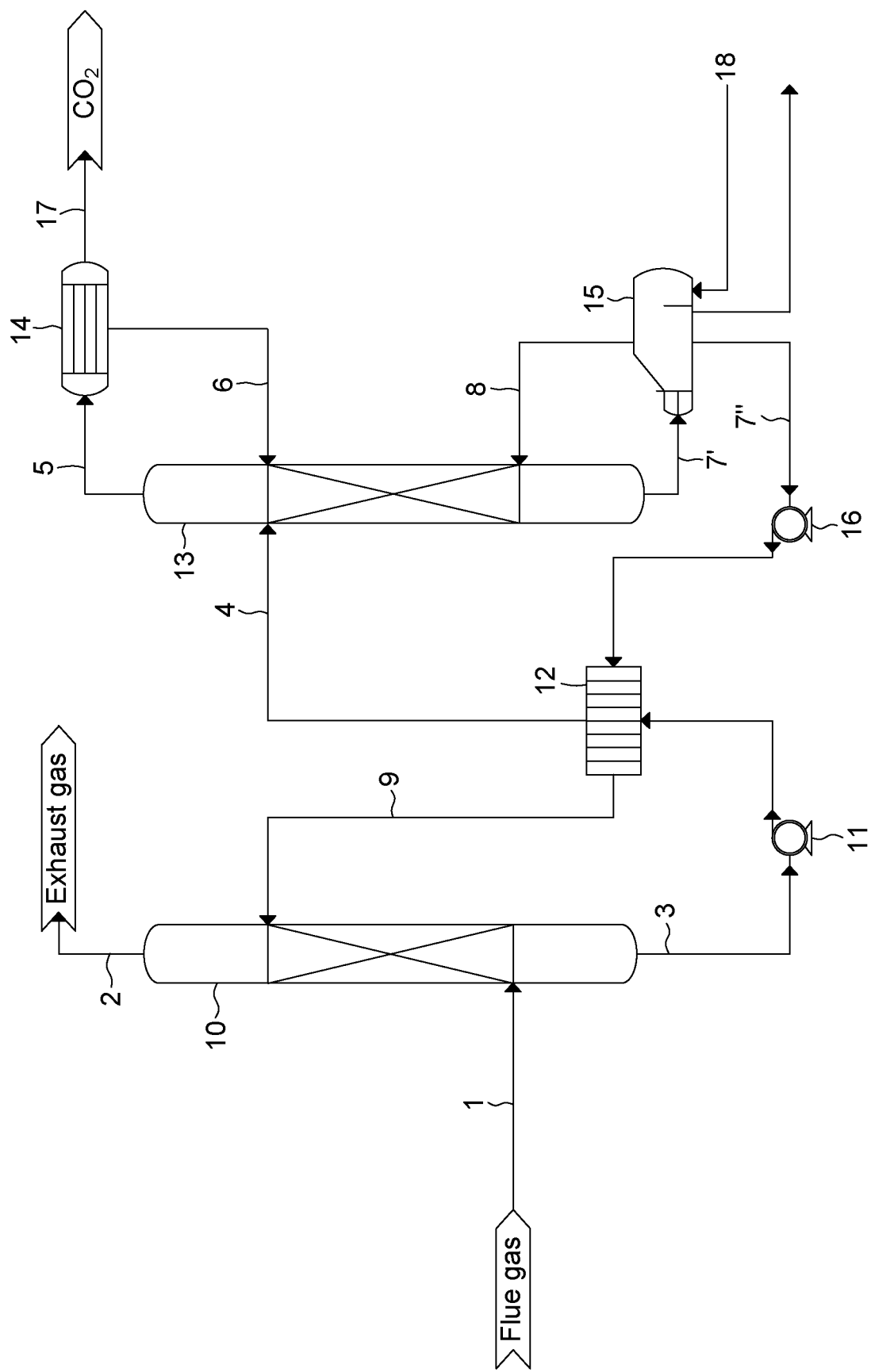
FIG. 1: Simplified process diagram for an MEA $CO_2$ capture process.

Various techniques are described herein for enhanced heat integration in a $CO_2$ capture operation. In some implementations, one or more selected streams can be subjected to heat recovery and the recovered thermal energy can be transferred to the vacuum stripping stage of the $CO_2$ capture operation.

For example, heat can be recovered from an overhead gas stream produced by the stripper for reuse in a reboiler of the stripper. This heat recovery can be performed by compressing the overhead gas stream, transferring heat from the compressed gas stream to a heat transfer fluid, and then transferring heat from the heat transfer fluid to a reboiler used to provide heat to the stripper. In another example, heat can be recovered from flue gas by indirect heat transfer and then reused in the reboiler. A heat transfer circuit can be implemented to recover heat from the overhead gas stream and the flue gas using a heat transfer fluid that circulates therein. The heat transfer circuit can include an overhead recovery loop enabling the heat transfer fluid to receive thermal energy from the compressed gas stream, and a flue gas recovery loop allowing the heat transfer fluid to receive thermal energy from the flue gas. The overhead recovery loop and the flue gas recovery loop can be operated as two parallel loops that pass through respective heat exchangers, and then the heat fluids are combined into a single heat transfer line that transfers heat to the reboiler, e.g., by passing through the reboiler of the vacuum stripper.

It has been found that in post-combustion $CO_2$ capture operations, heat integration strategies can be implemented to notably enhance the use of heat rejections from the process in such a way that the thermal energy demand of the $CO_2$ capture process for a host facility and the associated energy penalty are considerably reduced.

In some implementations, systems and processes are provided in the context of $CO_2$ capture operations where the stripper is operated under vacuum pressure conditions and at a temperature lower than 100° C., and where the $CO_2$/steam stream leaving the stripper is compressed and then cooled down by recovering thermal energy of the compressed gas using a heat transfer fluid which flows through the reboiler and provides a fraction of the thermal energy for the regeneration of the absorption solution.

While various details and optional features regarding heat recovery and integration techniques will be described herein, some additional information regarding $CO_2$ capture operations and baseline processes will also be provided.

While amine-based (e.g., MEA) $CO_2$ capture operations are quite prevalent, post-combustion $CO_2$ capture technology can also be conducted using non-carbamate forming solutions comprising compounds such as tertiary alkanolamines, sterically hindered primary alkanolamines, tertiary amino acids and carbonates. In such cases, the absorption solution that includes the absorption compound forming no carbamates may be used in combination with an absorption promoter, activator and/or catalysts. One feature of these post-combustion $CO_2$ capture processes, based on the fact that no carbamates are formed in the solution, and consequently no regeneration temperatures over 100° C. are required, is that operation can be conducted under vacuum conditions at temperatures lower than 100° C.

Similar to amine-based $CO_2$ capture technologies, such processes operating under vacuum stripping conditions, are based on the use of absorption and desorption units. However, the regeneration of the absorption solution is performed under vacuum conditions and consequently the regeneration temperature is below 100° C. This provides the opportunity to use waste heat streams having an energy quality lower than steam (which is used for conventional $CO_2$ capture technologies) and a temperature below 100° C., to contribute to the thermal energy requirements for the reboiler operation. This can result in a considerably reduced energy penalty of the $CO_2$ capture installation on the host site.

However, to reduce the need for such waste heat streams, the availability of which may or may not be sufficient to cover the entire thermal energy required for the $CO_2$ capture process, it is also advantageous for $CO_2$ capture processes to have a lower thermal energy requirement from the host facility. By enhancing the use of heat rejections from the $CO_2$ capture process, different heat integration strategies can result in different $CO_2$ capture process configurations with a reduced thermal energy consumption. The addition of an overhead vapour compression unit is one of the preferred ways to enhance the thermal energy use in the process and improve energy independence of the $CO_2$ capture process over the host facility.

Heat integration work has been conducted to reduce the use of external thermal energy for amine-based post-combustion $CO_2$ capture technologies. The objectives of these strategies were to recover process heat rejections, improve their thermal energy quality, to provide thermal energy to the reboiler. Different strategies were investigated for the MEA case and are all focused on delivering steam that could be used at the reboiler to reduce the energy penalty of the MEA process on the potential host site. The regeneration step in the MEA process is conducted using a stripper connected to a reboiler; the operating pressure is 2 bars, and the temperature is higher than 100° C. In heat integration strategies described below (FIG. 1), the steam to be used in the reboiler has a temperature higher than 100° C. and is at a pressure above atmospheric. A brief description of 2 strategies applied to the MEA $CO_2$ capture technology is provided below.

FIG. 1 shows a reference MEA process, as a base case for the discussion. In the MEA process, a flue gas (1) is fed to an absorber (10) and is counter-currently contacted with the MEA aqueous solution flowing downward (9). The treated gas, depleted in $CO_2$, exits the absorber and is eventually released into the atmosphere. The rich MEA solution (3) is pumped (pump 11) through a lean/rich exchanger (12), and the heated solution (4) is fed to the stripper column (13). The solution flows downward in the stripper and is contacted with a gas phase comprising water vapour and desorbed $CO_2$. The lean solution (7') is sent to the reboiler (15) and is heated using steam as a heating fluid (18). The lean solution is partially evaporated, and the produced water vapour (8) leaves the reboiler (15) and is sent to the stripper (13) and is used as a stripping gas to favour the $CO_2$ desorption from the rich MEA solution. The gas phase exiting the stripper (5) is composed of water vapour and $CO_2$. This gas phase is cooled down in a condenser (14). Water is condensed and sent back to the stripper (6). The $CO_2$ gas (17) is sent to further processing units such as compression units. The lean solution leaving the reboiler (7") is pumped back (pump 16) to the lean/rich exchanger (12) and lean solution exchanger (16) to be cooled down and then to the absorber column (10).

Figure 2:
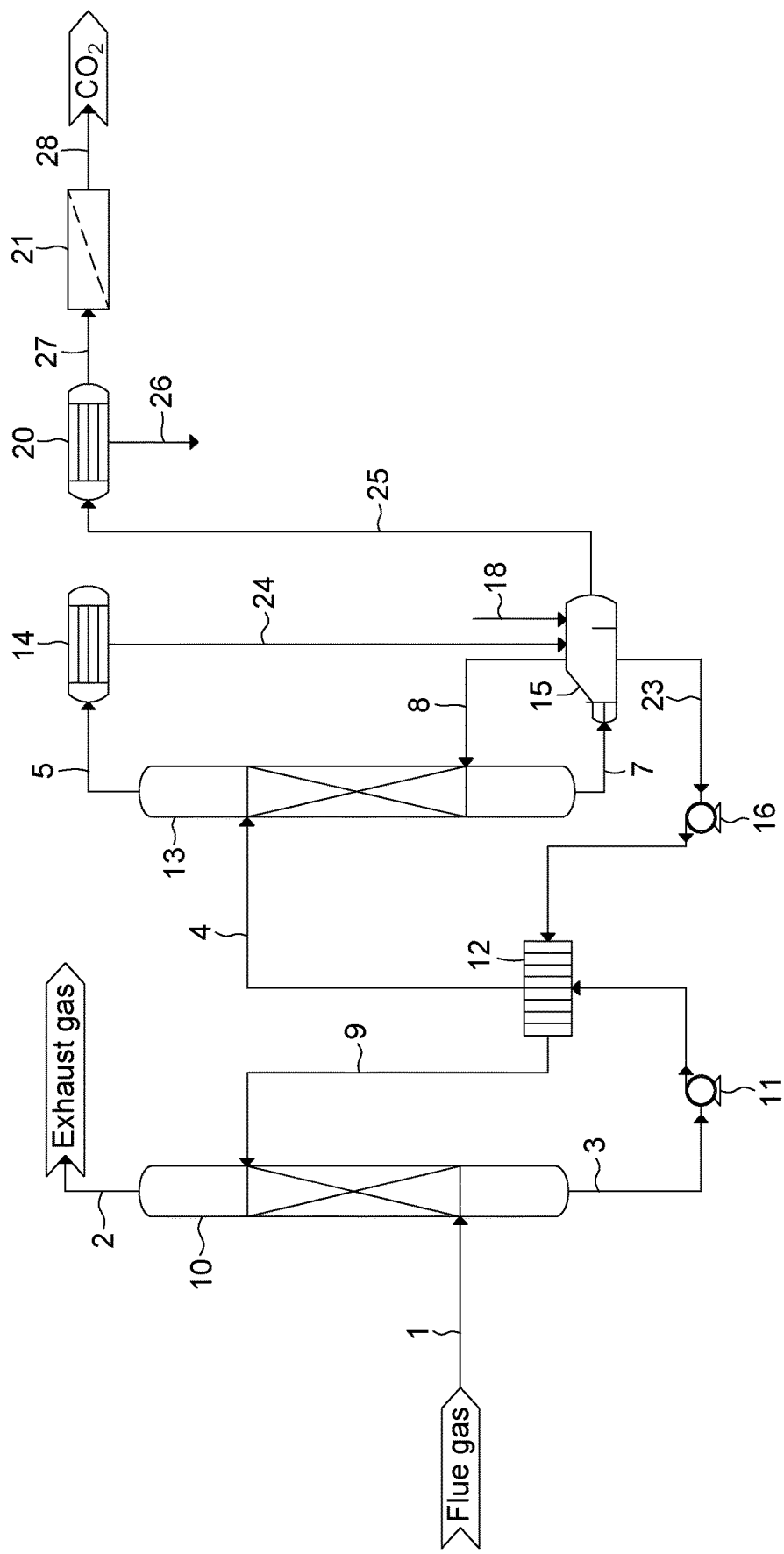
FIG. 2: Simplified process diagram of an MEA $CO_2$ capture process with vapour recompression and heat recovery at the overhead of the stripper.

A first strategy to minimise the thermal energy requirement, as shown in FIG. 2, includes vapour recompression and heat recovery. In this process configuration, the condenser (14) of FIG. 1 is removed and replaced with a compression train having many stages (19). In this way, the $CO_2/H_2O$ stream (5) is compressed at a higher pressure and temperature. The resulting high pressure and high-temperature $CO_2/H_2O$ stream (24) is fed to the reboiler (15) where it is used, in combination with the conventional steam source (18), to heat the lean absorption solution and produce water vapour that will be sent to the stripper column (13). The stripper is operated at a pressure above atmospheric, usually close to 2 bars and a temperature higher than 100° C. The $CO_2/H_2O$ stream (25) is then sent to a condenser (20) where vapour is condensed. The $CO_2$ is then sent to a next unit for further processing (21) or use. The condensed water (26) is recycled in the process.

Figure 3:
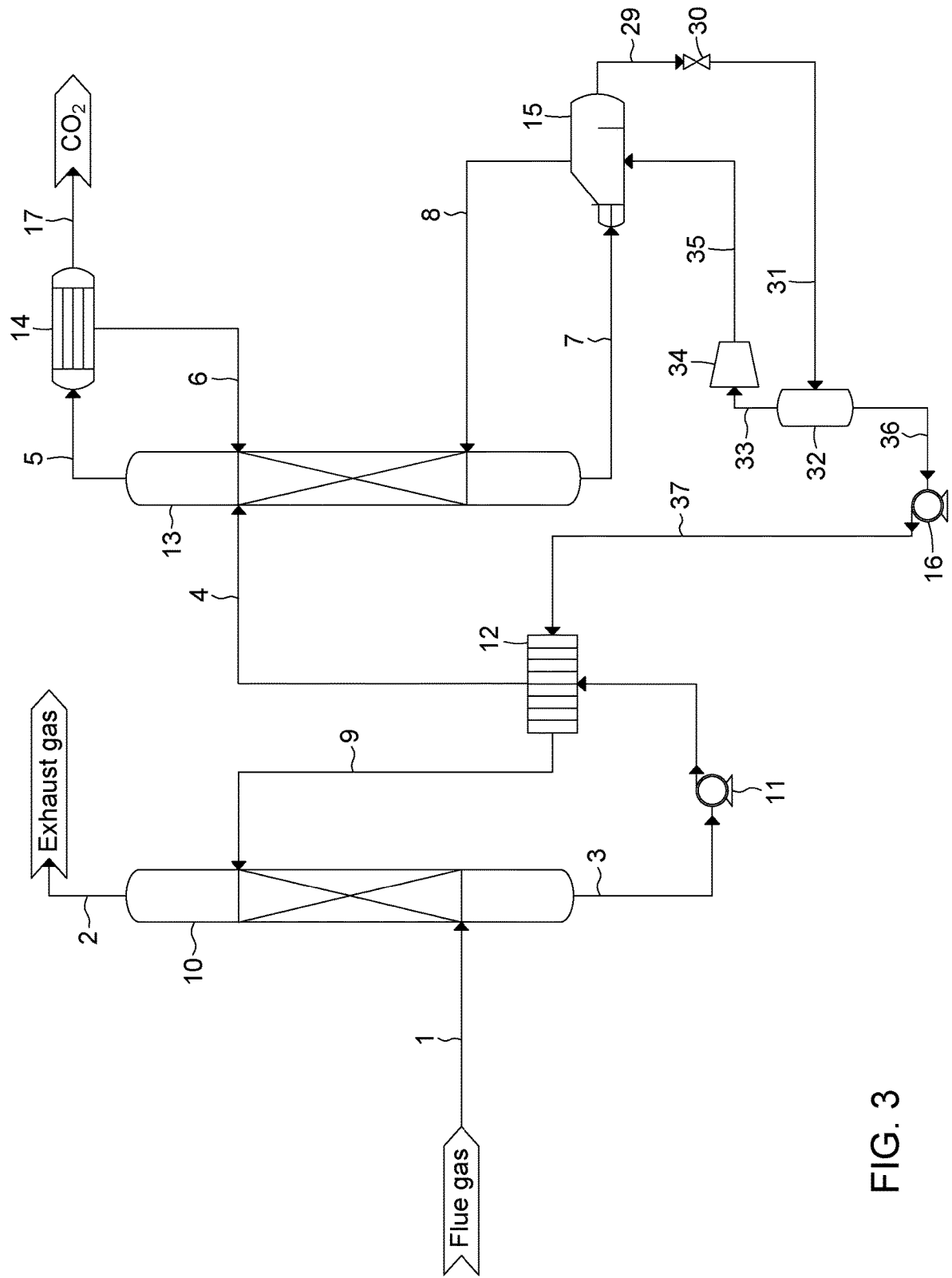
FIG. 3: Simplified process diagram of an MEA $CO_2$ capture process with lean vapour recompression at the reboiler.

A second strategy known as lean vapour recompression is shown in FIG. 3. In this strategy, the lean solution leaving the reboiler (29) is sent to a valve (30) where the pressure is decreased from 2 bar to 1.2 bar. The stream is then sent to a flash unit (32) where the liquid and vapour phases are separated. The liquid is pumped (36) to the lean/rich exchanger (12) and then to the absorber. The vapour (33) is fed to a compressor (34) where its pressure and temperature are increased (35) and then sent back to the reboiler (15) to provide the thermal energy required for the reboiler operation.

In the case of the innovative techniques described herein, the $CO_2$ capture operation is based on the use of an absorber and a stripper unit, but the baseline process is different from the conventional amine-based $CO_2$ capture process and is described below and shown in FIG. 4. While FIG. 4 represents an example baseline $CO_2$ capture process with which the innovative heat integration techniques can be implemented, it should also be noted that this process configuration is an example and there are various other process configurations and variations that can be used in the context of the technology described herein.

Figure 4:
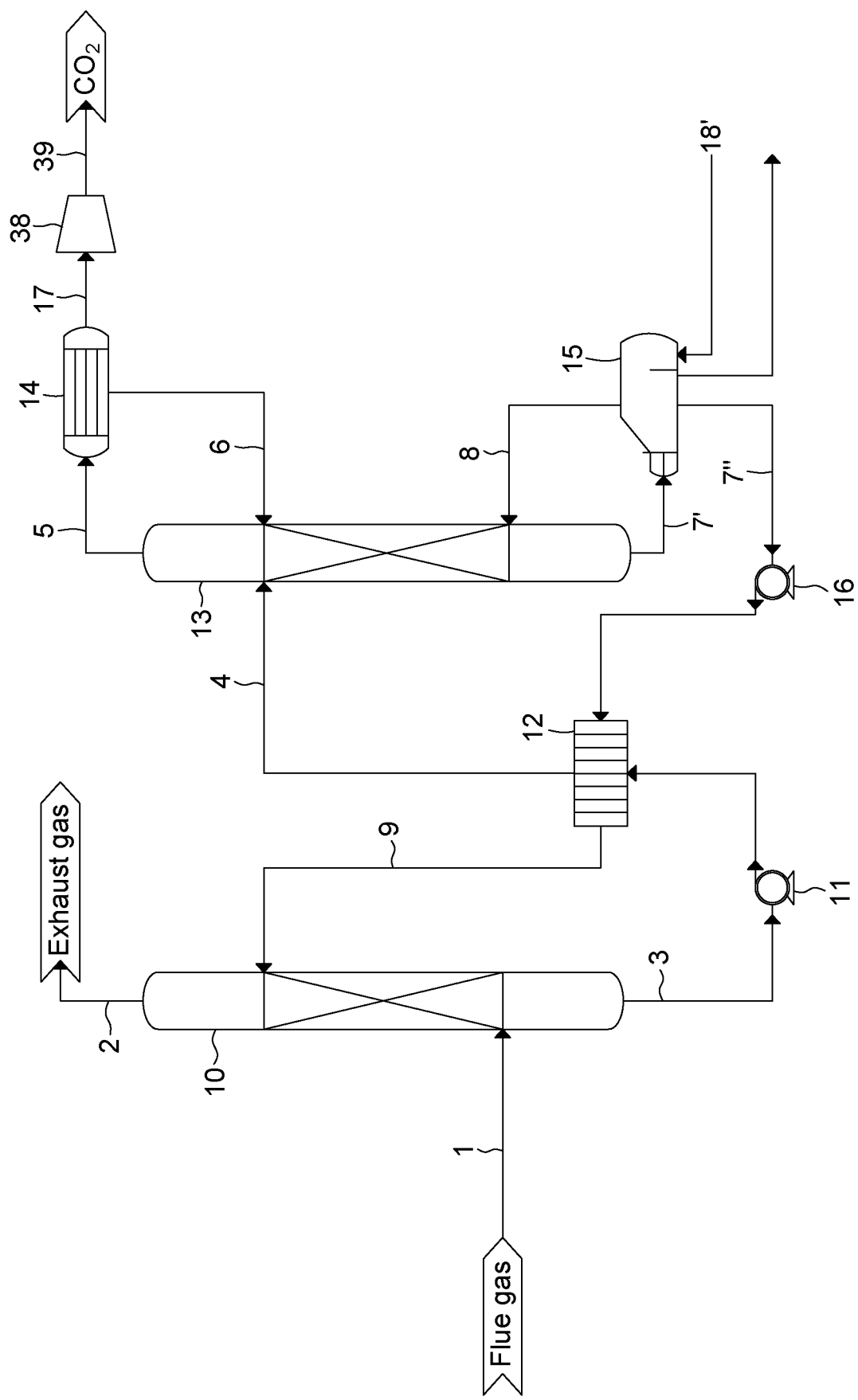
FIG. 4: Simplified process diagram of a $CO_2$ capture process for which the stripper is operated under vacuum conditions.

Referring to FIG. 4, a gas containing $CO_2$ (1) is fed to the absorption column (10). The gas (1) is contacted with the lean absorption solution (9) in a countercurrent flow. The cleaned gas is then discharged and then sent to additional treatment units if required (2). The rich absorption solution (3) leaving the absorber column (10) is then pumped (pump 11) towards a lean/rich heat exchanger (12) to have its temperature increased, and the heated rich solution (4) is then fed to the stripper column (13). The rich solution flows downward and is contacted with steam flowing countercurrently. Because of the contact of the solution with the steam, the $CO_2$ is desorbed from the solution as a gas and flows upward, with steam, towards the top of the stripper. The $CO_2$/water vapour mixture leaving the stripper (5) is sent to a reflux condenser (14), and the condensed water (6) is sent back to the stripper (13). The steam is produced by sending the lean absorption solution leaving the stripper (7') to the reboiler (15). The reboiler enables the evaporation of a fraction of the lean absorption solution and thus provide steam (8). As the stripper is operated under vacuum conditions, the produced steam has a pressure below atmospheric and is at a temperature below 100° C. The temperature of the steam will depend on the vacuum conditions adopted. The steam temperature corresponds to the solution boiling temperature under the process vacuum conditions. The thermal energy required for the reboiler to evaporate water is provided using a hot fluid (18'), with a low thermal energy quality and having a temperature below 100° C. More specifically, the hot fluid should have a temperature at least 5-10° C. above the boiling point of the solution. Some examples will be provided further below. The steam (8) is then fed to the stripper. The lean absorption solution leaving the reboiler (7") is then pumped back (pump 16) towards the lean/rich exchanger (12) to be cooled down, and then the lower temperature solution (9) is fed back to the absorber (10). Coming back to the gas leaving the reflux condenser (14), mainly composed of $CO_2$, it flows through a vacuum pump (38) and is then sent to further treatment units if required or to other processes for its final use or sequestration.

Figure 5:
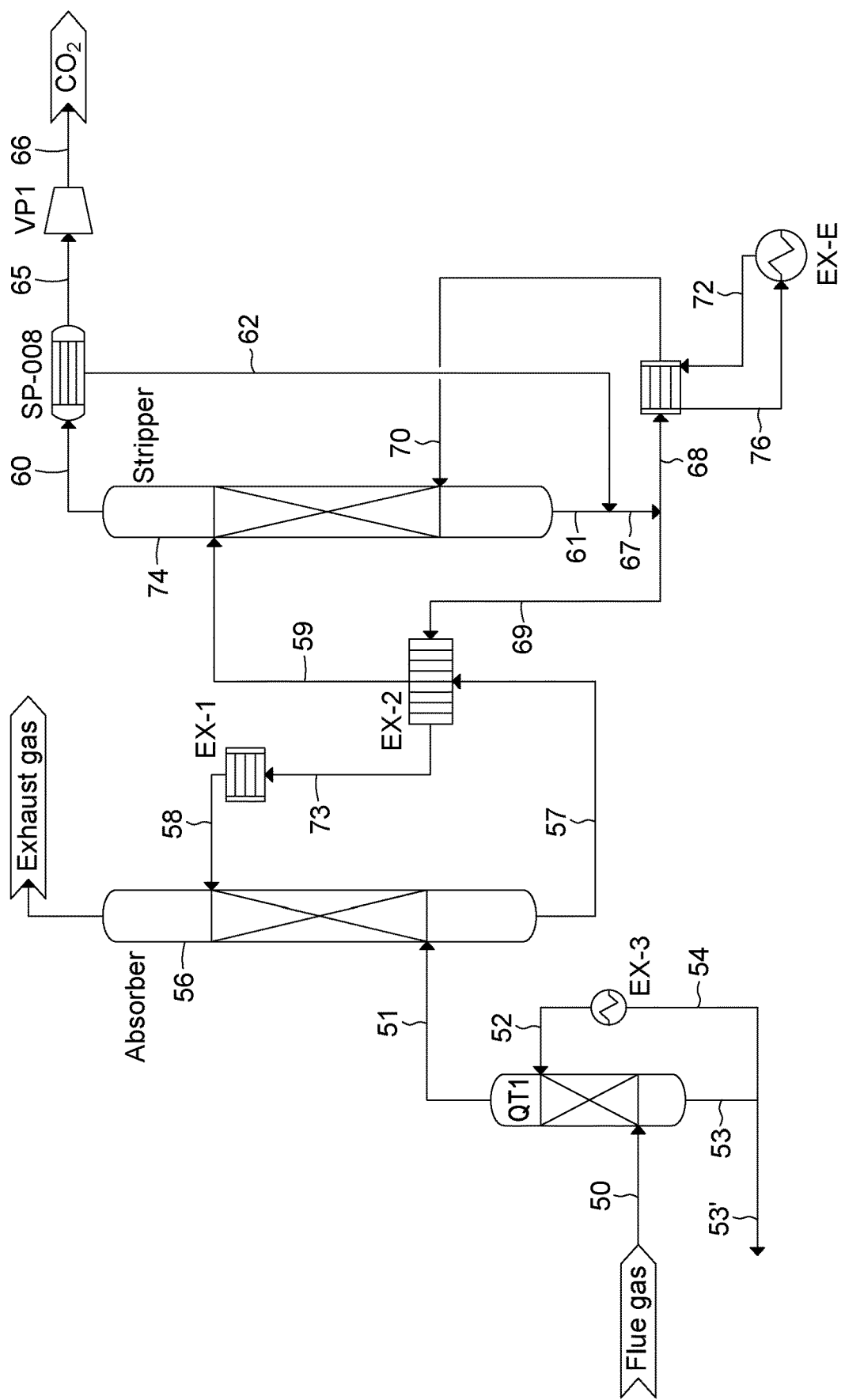
FIG. 5: Detailed process diagram of a $CO_2$ capture process for which the stripper is operated under vacuum conditions and the thermal energy requirement for the reboiler is provided by the host plant.

FIG. 5 shows a detailed diagram of $CO_2$ capture process installed on an industrial host facility and the description is provided as follows: A flue gas containing $CO_2$ (50) is fed to a quench tower (QT1) to be cooled down using cooling water (52). As the gas flows in (QT1), its temperature is decreased and water vapour is condensed. The cooled flue gas (51) is fed to the absorber (56). The cooling water exiting (53) the quench tower (QT1), having an increased temperature and containing the condensed water is sent to a cooler (EX-3). A fraction of the stream (53) can be bled (53') to maintain the water mass balance in the cooling water loop. Stream (51) flows upward in the absorber (56) and is contacted with a lean absorption solution (58) flowing downward. The treated gas, with a lower $CO_2$ content, is sent to the atmosphere (56) or back to the upstream process. The absorption solution, now rich in $CO_2$, (57) leaves the absorber and is sent to a rich-lean heat exchanger (EX-2) to be heated. The solution leaving (EX-2) (stream 59) is fed to the stripper (74). In the stripper, the rich solution (59) flows from the top towards the bottom of the stripper and flows contercurrently with a gas phase moving upward. This gas phase, mainly composed of steam, is coming from the reboiler unit (EX-6). The contact of the solution with the steam will favor the desorption of the $CO_2$ present in the solution. The temperature of the stripper is determined by the pressure or vacuum applied to the system, using a vacuum pump (VP1). Under the conditions of interest, the stripper is operated under vacuum i.e. below atmospheric pressure and the corresponding temperature in the stripper is determined by the boiling temperature of the solution under the applied vacuum conditions. The solution leaving the stripper (61), lean in $CO_2$, is combined with water condensed at the cooler unit (SP-008) (stream 62) and the obtained aqueous solution (67) is split in two parts. Stream (69) is fed to the rich-lean exchanger (EX-2). Stream (68) is fed to the reboiler (EX-6) where the aqueous solution is heated such that water evaporates and generates steam. The steam/lean absorption solution mixture leaving the reboiler (70) is sent back to the stripper (S1). The thermal energy required at the reboiler is supplied from heat rejections coming from the host plant and indicated as (EX-E). The steam present in the steam/lean absorption solution mixture will flow upward in the stripper and contact the rich absorption solution. The lean absorption solution is mixed with the solution coming from the top of the column. At the top of the stripper, a gas phase containing steam and $CO_2$ exits (60) and is cooled down in the cooler (SP-008) to make steam condense. The condensed water (62) leaves the cooler and is mixed with stream (61) as mentioned above. The gas leaving the cooler (65) highly concentrated in $CO_2$ is flowing through the vacuum pump (VP1) and then sent (66) to a further treatment or process unit. The solution leaving the rich-lean exchanger (stream 73) is further cooled down when flowing through a trim cooler (EX-1) and then fed back into the absorber as stream (58).

Figure 6:
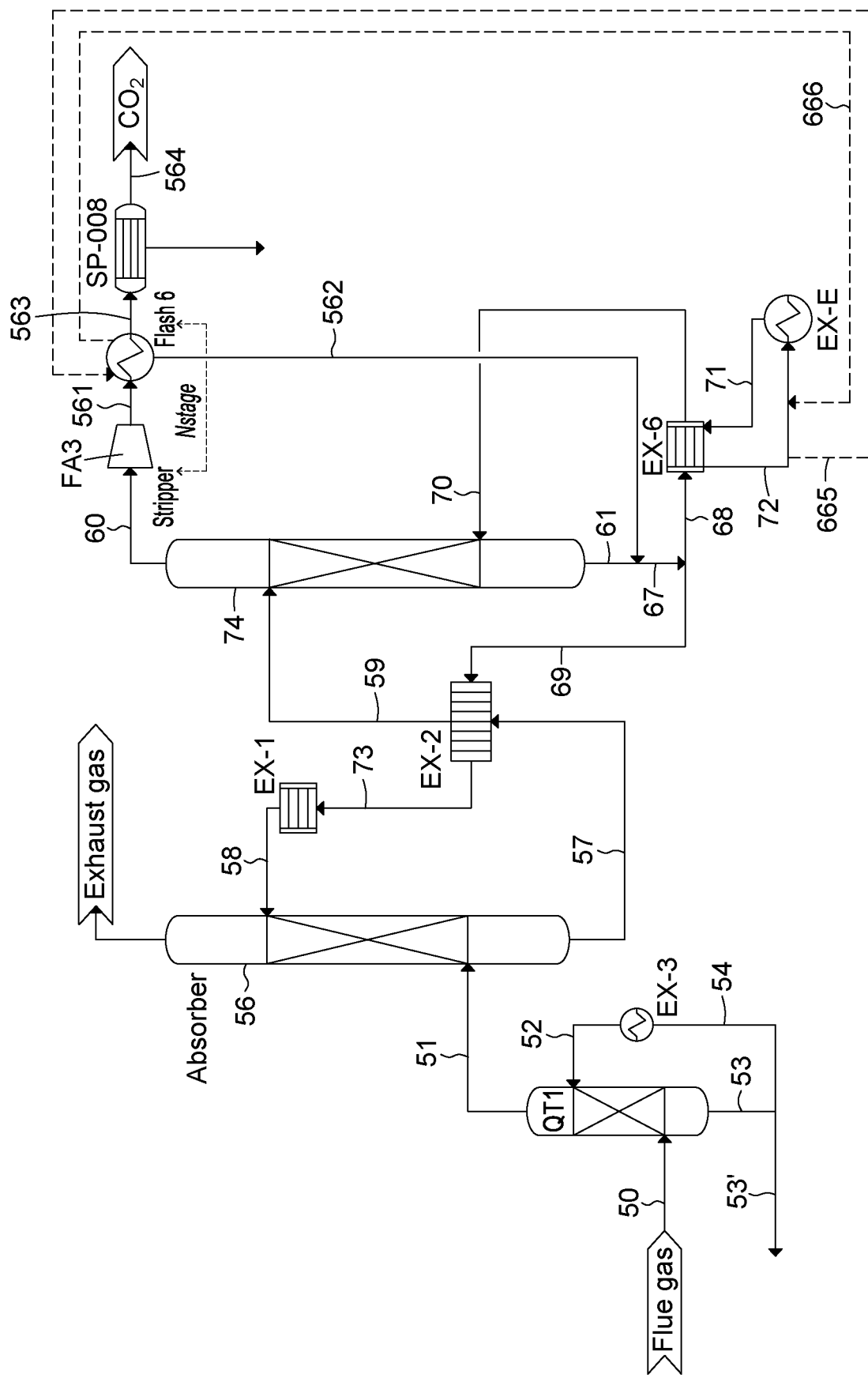
FIG. 6: Process diagram of a $CO_2$ capture process operating solution regeneration under vacuum conditions and equipped with an overhead vapour compression unit at the stripper overhead.

Referring now to FIG. 6, one possible configuration to reduce the need for external heat rejections as a thermal energy source is described. In this configuration, the overhead gas stream (60) from the stripper (74) is subjected to heat recovery for reuse of the heat in the reboiler (EX-6) of the stripper, and this is preferably achieved by compressing the gas and indirectly recovering heat therefrom. As illustrated, an overhead vapour compression unit is provided at the exit of the stripper. This new configuration enables recovery of part of the latent heat from the steam present in stream (60) leaving the stripper and also to increase the quality of the thermal energy by increasing the stream's temperature. The addition of the overhead vapour compression unit brings some changes to the process described previously and shown in FIG. 5. A first modification is that the vacuum pump (VP1 in FIG. 5) is removed and compression/cooling stages are added. Another modification is that a loop between the compression/cooler stages and the reboiler (EX-6), comprising the use of a heat transfer fluid, is added in order to transfer the heat from the hot fluid at the top of the stripper to the reboiler as will be described below. This loop can be referred to as an overhead recovery loop and it can be part of an overall heat transfer circuit, which will be further described below. Each cooling unit is fed with a cold heat transfer fluid (665) that will cool down the compressed $CO_2$/steam and make water condensed. The heated heat transfer fluid is then pumped back (666) towards the reboiler. In more detail, the steam/$CO_2$ stream leaving the stripper (60) flows through a compressor (FA-3) which causes its temperature to increase then the heated gas (561) is sent to a cooler (Flash-6) where the gas is cooled down and part of the steam is condensed. The number of compression/cooling stages depends on the compression ratio which is generally 2 or 3. There can be either one cooler to recover energy and another cooler to further reduce the temperature of the $CO_2$/$H_2O$ stream before entering the compressor. The heat released when water is condensed, is transferred to the heat transfer fluid (665). The condensed water leaves the cooler (562) and the gas phase (563) is then sent to a cooling unit (SP-008) to adjust its temperature and water content. The temperature of the gas leaving the cooler corresponds to the temperature needed for the next step (for example, storage, compression use by a conversion unit). The heat transfer fluid, which can absorb the energy at the different cooling units (e.g., Flash-6 and/or SP-008) for the present description is then pumped toward the reboiler (EX-6). The fluid transfers its energy to stream (68) and enable water to evaporate and create steam from the absorption solution. The low temperature heat transfer fluid is then sent back to the compression/cooling stages for another cycle. In the event that the heat transfer fluid cannot fulfill the entire energy requirement, one possibility is that the missing thermal energy can be extracted from the external host site (71). In one possible configuration, the heat transfer fluid is contacted via a heat exchanger unit to recover the thermal energy coming from the host facility (see arrangement with EX-E in FIG. 6 where the heated fluid from the overhead compression is fed through EX-E to provide the top-up heating requirements).

Optional heat transfer fluids are water, methanol and glycol. It should be noted that the heat transfer circuit can be a closed system in which the heat transfer circulates to transfer heat from the overhead stream to the reboiler, and the heat transfer fluid can be selected depending on various operating conditions, such as temperture and pressure ranges, as well as the design details of the heat recovery system that can depend on the host facility; and can also be selected based on its boiling temperature (in order to store energy as latent heat) as well as safety issues.

Figure 7:
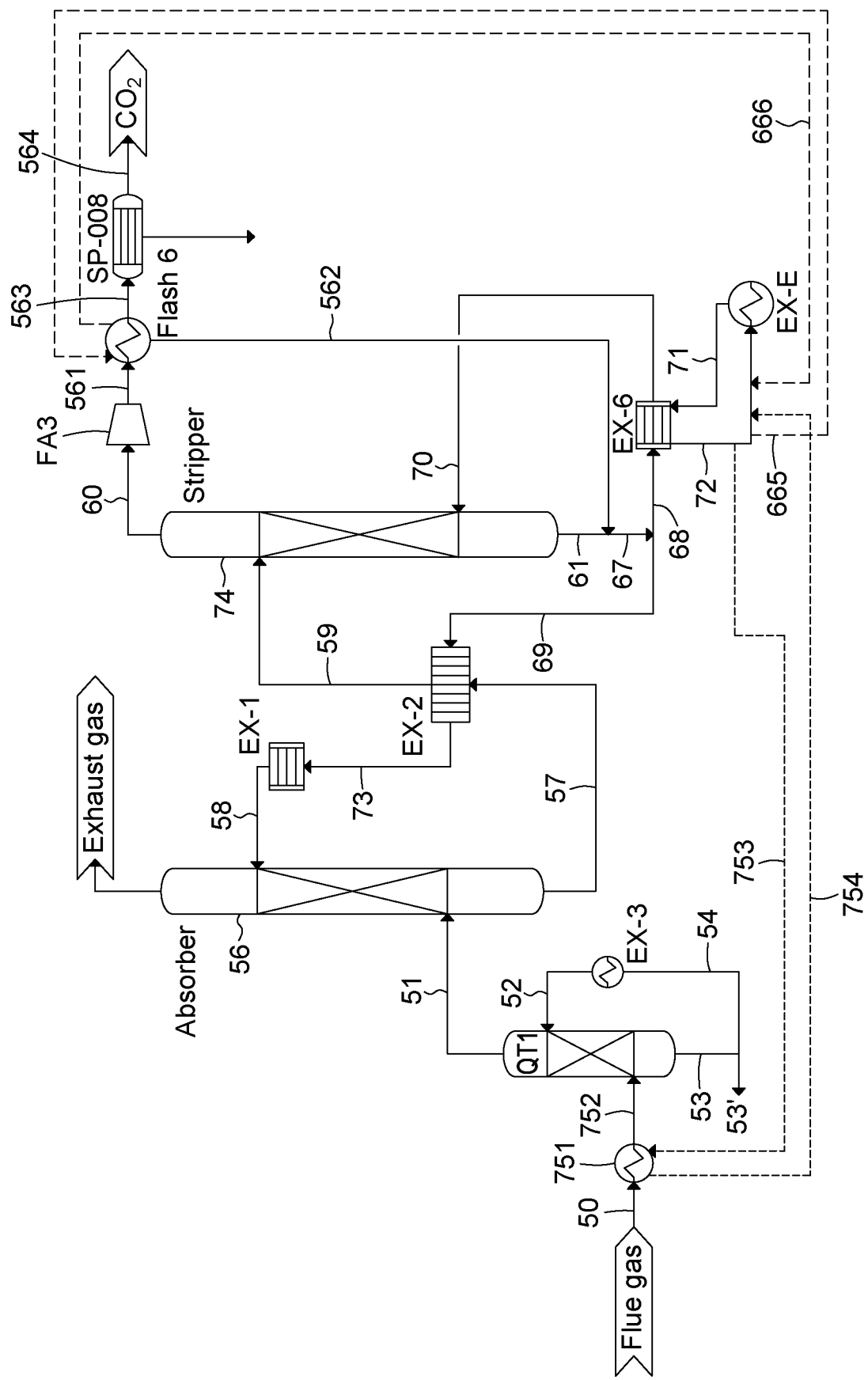
FIG. 7: Process diagram of a $CO_2$ capture unit installed on a host site where thermal energy requirement for the reboiler is recovered from the flue gas and the overhead compression unit.

Another advantageous configuration is illustrated in FIG. 7, where in addition to the overhead vapour compression, part of the energy of the incoming flue gas to be treated (50) is also recovered for reuse in the reboiler. An additional heat exchange loop (which can be referred to as a flue gas recovery loop), between the flue gas stream (50) and the heat transfer fluid stream can be introduced. More specifically, a fraction of the heat transfer fluid leaving the reboiler (72) can be sent towards a heat exchanger (751), and part of the energy of the flue gas is transferred to the cold heat transfer fluid (753). The heated heat transfer fluid (754) is sent back to the reboiler (EX-6) after being combined with heat transfer fluids coming from the overhead compression loop (666) and the host site (EX-E). In this way, the thermal energy requirement from the host site is reduced and decreases the penalty of the $CO_2$ capture process on the host site.

While the two heat transfer loops can be integrated as part of a single heat recovery circuit, as illustrated in FIG. 7, it is also noted that the loops can be separate. Also, in some implementations, instead of two parallel loops, the heat recovery circuit can be configured as a single loop where the heat transfer fluid passes through exchangers to receive heat from the compressed overhead stream and the flue gas in series. In a preferred implementation of the heat transfer circuit, multiple heat recovery loops are configured in parallel to recover heat from different sources while leveraging higher temperature gradients. For example, the heat transfer circuit can include at least two of the following heat recovery loops arranged in parallel: a flue gas recovery loop, an overhead recovery loop, and an external heat recovery loop. It should be noted that the heat transfer circuit can also have other heat recovery loops combined with one or more of the aforementioned three loops. Preferably, the heat recovery loops all feed back into a single hot fluid line that is supplied into the reboiler for indirectly transferring heat to the regenerated solution in the reboiler and producing a cooled heat transfer fluid that is again fed into the various heat recovery loops. It is also noted that there may be multiple flue gas recovery loops arranged in parallel or multiple overhead heat recovery loops arranged in parallel for recovering heat in parallel from different flue gas streams, different overhead streams, or different parts of an overhead gas train. While a series type arrangement of the heat recovery loops is possible, this could result in lower temperature gradients compared to parallel loops and higher heat transfer fluid flow rates would be required for the circuit.

The heat recovery process can be implemented such that all or substantially all of the heat is transferred to the reboiler of the vacuum stripper. However, it is also noted that the heat recovery process can be implemented so that a part of the recovered thermal energy is transferred to other equipment in the overall $CO_2$ capture operation, if desired.

The configurations of FIGS. 6 and 7 may be applied to post-combustion $CO_2$ capture processes where the regeneration of the absorption solution is conducted in a stripper unit operated under vacuum conditions. The different configurations will be illustrated and contrasted in the Examples section.

The heat integration techniques can be implemented in the context of various $CO_2$ capture operations that may have some different operating conditions, equipment arrangements, and other features, some of which are described below.

In one embodiment, the absorption solution comprises water and non-carbamate forming absorption solution compound. Such non-carbamate forming compounds belong to the following categories: sterically hindered primary alcanolamines, sterically hindered amines, tertiary alcanolamines, tertiary amines, carbonates compounds and tertiary amino acids. In addition to these absorption compounds absorption solution may comprise an absorption promoter, a catalyst and/or a biocatalyst to increase the $CO_2$ absorption rate.

More particularly, the absorption compound may comprise 2-amino-2-methyl-1-propanol (AMP), 2-amino-2-hydroxymethyl-1,3-propenediol (Tris), N-methyldiethanolamine (MDEA), dimethylmonoethanolamine (DMMEA), diethylmonoethanolamine (DEMEA), triisopropanolamine (TIPA), triethanolamine, N-methyl N-secondary butyl glycine, diethylglycine, dimethylglycine, potassium carbonate, sodium carbonate, or mixtures thereof.

Examples of promoters, catalysts or biocatalysts are: piperazine, diethanolamine (DEA), diisopropanolamine (DIPA), methylaminopropylamine (MAPA), 3-aminopropanol (AP), 2,2-dimethyl-1,3-propanediamine (DMPDA), diglycolamine (DGA), 2-amino-2-methylpropanol (AMP), 1-amino-2-propanol (MIPA), 2-methyl-methanolamine (MMEA), piperidine (PE), arsenite, hypochlorite, sulphite or the enzyme carbonic anhydrase. The promoter or catalyst can also be selected from the group comprising glycine, sarcosine, alanine N-secondary butyl glycine and pipecolinic acid.

One preferred embodiment of the techniques described herein is related to the $CO_2$ capture process based on the use of a potassium carbonate solution as an absorption solution. An additional embodiment is related to a process where the enzyme carbonic anhydrase (CA) is used to promote the absorption rate of the solution. The enzyme is preferably provided free in solution and circulates with the solution through the absorber and stripper. The enzyme can also be provided immobilised with respect to particles that flow through the system, immobilised on fixed internals within the absorber and optionally the stripper, or delivered in other ways. Various types, variants, analogues and classes of CA can be used, and can be selected based on stability and activity within the operating window of the given $CO_2$ capture operation.

Some aspects of the innovative technology described herein will be illustrated through the following experimentation section. For this purpose, Protreat® simulator was used to perform mass and energy balances as well as the design of the packed bed columns. Protreat® is a state-of-the-art rate-based simulator for gas treating marketed by Optimized Gas Treating Inc. (OGT) of Houston, Texas. This simulator was implemented with a kinetic module to represent the catalytic effect of a CA enzyme from $CO_2$ Solutions Inc. in a $K_2CO_3/KHCO_3$ absorption solution on $CO_2$ capture.

The following is an additional list of some of the optional features of the techniques described herein:

- Heat exchangers are added in between each compression stage to recover heat at a temperature above the temperature required at the reboiler. The temperature should be at minimum 2 degrees over the boiling temperature. A broader approach is preferable to reduce the flow rate needed to provide the required thermal energy.
- A heat exchanger may be added to recover the heat from the flue gas which temperature is above the temperature required at the reboiler. A minimum of 2 degrees is required for a plate exchanger. A temperature difference of at least 5° C. should be between the entering flue gas and the low temperature of the heat transfer fluid. For Example 1, where the low temperature of the heat transfer fluid is 74.5° C., the flue gas should be at a temperature of at least 79.5° C. to be used. However, a broader approach is preferable to reduce the flow rate needed to provide the required thermal energy.
- Under a conventional process configuration, the stripper overhead usually goes directly to a condenser but in order to increase heat quality of the gas leaving the stripper, a compressor and a heat exchanger (overhead vapour compression or "OVC" unit) or a train of such units, is added at the stripper overhead in order to recover heat above the boiling temperature at the reboiler. This increases the gas temperature because of the pressure rise.
- Direct and/or indirect contact heat exchanger can be used for various applications of the heat integration process.
- Possible heat exchanger types: Plate heat exchanger, shell and tubes heat exchanger, and others.
- Preferred heat exchanger type (e.g., for the CA-based process): plate heat exchanger. Its advantages are a more compact design and a smaller temperature approach than other heat exchanger types can be used. For example, the approach temperature of a plate exchanger can be as small as 2° C., whereas for a shell and tube exchanger, the approach temperature is more typically 15° C. For the enzyme application, this can limit the temperature the enzyme is exposed to, and consequently, the decay of the enzyme is lowered. Depending on the temperature of the fluid from which heat is being recovered, different heat exchanger types can be used for different heat recovery loops (e.g., shell-and-tube exchanger for the flue gas recovery loop if the flue gas has a high temperature; plate exchanger for the OVC loop).
- Any compressor type can be used. For OVC, compressors and vacuum pump can be used. In one of the examples, the vacuum fan acts as a compressor and then multiple additional dedicated compressors are also used for heat recovery from the overhead streams.
- Vacuum operation of the stripper: absolute pressure at the reboiler can be between 0.1 and 1 bar. Preferred ranges for the process are 0.1 to 0.8, 0.1 to 0.5, 0.2 to 0.3 bars, for example. Lower pressure ranges, such as 0.1 to 0.5 or 0.2 to 0.3 bars, can facilitate providing a heat integration system that can significantly reduce or eliminate the energy penalty to the host facility. For clarity, it should be noted that vacuum pressures for the stripper as disclosed herein should be considered to be absolute pressures, which are below atmospheric pressure.
- The minimum temperature difference between the heat transfer fluid and the waste heat stream is 2° C. for a plate heat exchanger.
- Possible temperature range for the gas leaving the OVC step: 20 to 200° C. The preferred temperature range is 30 to 100° C.
- Compression ratio range: between 2 to 4, preferable: 2 to 3, preferred 3 (3 is a standard value, and consequently the equipment is easily available and less costly. Certain types of compressors such as supersonic compressors can have a compression ratio as high as 10 and can be used in this application as well.
- Parrallel or series heat exchangers configurations can be used.
- Adding heat exchangers to further cool $CO_2$/vapour in the OVC unit before entering the following compressor stage.

It is noted that the broad concepts described or claimed herein can be combined with any optional features or combinations thereof described herein. For example, the general heat integration methods and system, as well as the $CO_2$ capture processes and systems can be modified by adding one or more features from the Examples section, the drawings, or other parts of the description, where such features could be specific operating parameters (temperatures, pressures, compounds, etc.) or ranges thereof, process or system configurations (e.g., heat recovery loop configurations, OVC configurations, inclusion of additional units such as coolers, exchangers, etc.). Also note optional features regarding operating conditions described herein can be used in combination with the broad concepts, and that particular optional operating values that may be disclosed can be used with a plus or minus 10% unless otherwise indicated (e.g., temperature and pressure values for the OVC in the Examples section, operating conditions of the various units as pers the Examples section, and so on). In addition, while specific equipment examples have been described (e.g., packed column for the absorber), it should be noted that various alternative types of equipment can be used for the different unit operations described herein, and multiple units provided in series or parallel can be used instead of a single piece of equipment, if desired. It is also noted that the host facility can be any number of facilities that generate $CO_2$ containing gas, such as a hydrocarbon recovery facility with steam generation, a steel or aluminum processing facility, a cement production facility, power plants that use biomass or petrochemical feedstocks, and/or various other facilities that produce flue gas or other suitable $CO_2$ containing gases.

EXAMPLES:
EXPERIMENTATION/SIMULATION/RESULTS

Example 1

$CO_2$ capture process based on the use of an absorption solution composed of water, an absorption compound which is potassium carbonate and of a biocatalyst carbonic anhydrase—no heat integration.

A CO₂ capture process is to be used to remove 90% of CO₂ present in a flue gas. The capacity of the CO₂ capture unit is 1250 tons per day. The flue gas composition is given in Table A.

TABLE A

Inlet Gas Parameters

| Parameter | 1250 tpd Case |
|---|---|
| Flow (kg/h) | 440 156 |
| Temperature (° C.) | 150 |
| Pressure (kPa) | 102 |
| H₂O (mol %) | 17.6 |
| CO₂ (mol %) | 8.3 |
| N₂ (mol %) | 70.8 |
| O₂ (mol %) | 2.5 |
| Ar (mol %) | 0.8 |

The $CO_2$ capture process considered for the process simulations is shown in FIG. 5 and is further described as follows: The flue gas (50), having characteristics and composition shown in Table A, is directed to a quench unit (QT1) having a packed column configuration. The flue gas is cooled with water at a desirable temperature for the process which is 30° C. for the present example. The water stream leaving the quench (53) is then sent to a cooling system (not shown) and the sent back to the quench unit (QT1). The flue gas, at a temperature of 30° C. (51), is then sent to the packed column absorber unit (56). The flue gas enters at the bottom of the packing and flows upwards and contacts an aqueous absorption solution (58), going downwards by gravity. The absorption solution (25) comprises potassium carbonate, potassium bicarbonate and the carbonic anhydrase (CA) enzyme. The potassium concentration in the solution is 2.9 M. The concentrations in carbonate and bicarbonate ions depend on the absorption and stripping process conditions. The CA enzyme concentration is below 0.1% by weight of the absorption solution. $CO_2$ dissolves in the solution and then reacts with the hydroxide ions (equation 1) and water (equations 2 and 3).

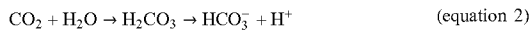

$$CO_2 + OH^- \rightarrow HCO_3^- \quad \text{(equation 1)}$$

$$CO_2 + H_2O \rightarrow H_2CO_3 \rightarrow HCO_3^- + H^+ \quad \text{(equation 2)}$$

$$CO_2 + H_2O \overset{CA}{\leftrightarrow} HCO_3^- + H^+ \quad \text{(equation 3)}$$

The CA-catalyzed $CO_2$ hydration reaction (equation 3) is the dominant reaction in the process. The fast enzymatic reaction enables a maximum concentration gradient across the gas/liquid interface and results in a maximum $CO_2$ transfer rate from the gas phase to the liquid phase, and, consequently in a high $CO_2$ capture performance. The flue gas with a lower $CO_2$ content (7) is discharged at the top of the absorber to the atmosphere.

Afterwards, the absorption solution containing $CO_2$ in the form of bicarbonate ions (57), also referred to as the rich absorption solution, is pumped and heated by passing through a heat exchanger (EX-2) and then fed at the top of the stripper (74). The solution flows downwards by gravity while contacting a stripping gas consisting of steam at a temperature ranging between 6° and 85° C. The stripper is operated under a partial vacuum to allow for this low-temperature range to work, a vacuum pump (VP1) is used for this purpose. The composition of the stripping gas is such that the dissolved $CO_2$ is released from the liquid phase and consequently bicarbonate ions are transformed back into dissolved $CO_2$ (equation 4) and then into gaseous $CO_2$. CA is also present in the stripper and catalyses the transformation of the bicarbonate ions into dissolved $CO_2$ (equation 3). The absorption solution, now made lean in $CO_2$, leaves the stripper at its bottom (61). A fraction of the solution (30) is pumped towards the reboiler (EX-6) where water is evaporated and then the liquid/steam mixture (70) is sent back to the stripper (74) and steam is used as the stripping gas. The energy for water evaporation is provided using waste heat coming from the plant where the capture unit is implemented (71), waste heat may, for example, be supplied using hot water (72). The absorption solution (69) is then pumped and cooled down by passing through two heat exchangers (EX-2 & EX-1) and is fed back into the top of the absorber column (56). Under the complete absorption/stripping cycle, the enzyme is exposed to a pH ranging between 9 and 10. The gas leaving the stripper (60), consisting of water vapour and gaseous $CO_2$, is sent to a condenser (SP-008). Once condensed, the water (62) is then sent back to the process and the $CO_2$ is sent from the vacuum pump (VP1) exits the $CO_2$ capture unit for future use (66).

$$CO_2 + H_2O \rightarrow H_2CO_3 \rightarrow HCO_3^- + H^+ \quad \text{(equation 4)}$$

When there is no heat integration, the entire thermal energy requirement comes from the host facility. For the present example, the thermal energy requirement is 3.34 GJ/ton $CO_2$ or 48 573 KW. For the present example, it is considered that the stripper operates under vacuum at an absolute pressure of 0.3 bar and a temperature of 70° C. To minimise the enzyme degradation in the reboiler, the maximum heat transfer fluid temperature providing the temperature to the reboiler should be 85° C. For the present example, we consider that a water stream (heat transfer fluid) at a temperature of 83° C. is used to provide thermal energy to the reboiler. The water stream will leave the reboiler at a temperature of 74.5° C. If available, the water stream can be taken as is from the host plant or it can be obtained by using hot liquids, hot gas that will be used to heat the heat transfer fluid (water or methanol for examples) from 74.5 to 83° C.

Example 2

Heat integration when the $CO_2$ produced has to be compressed for further uses. The final $CO_2$ gas is provided at a pressure of 157 bars before exiting the $CO_2$ capture process.

Figure 8:
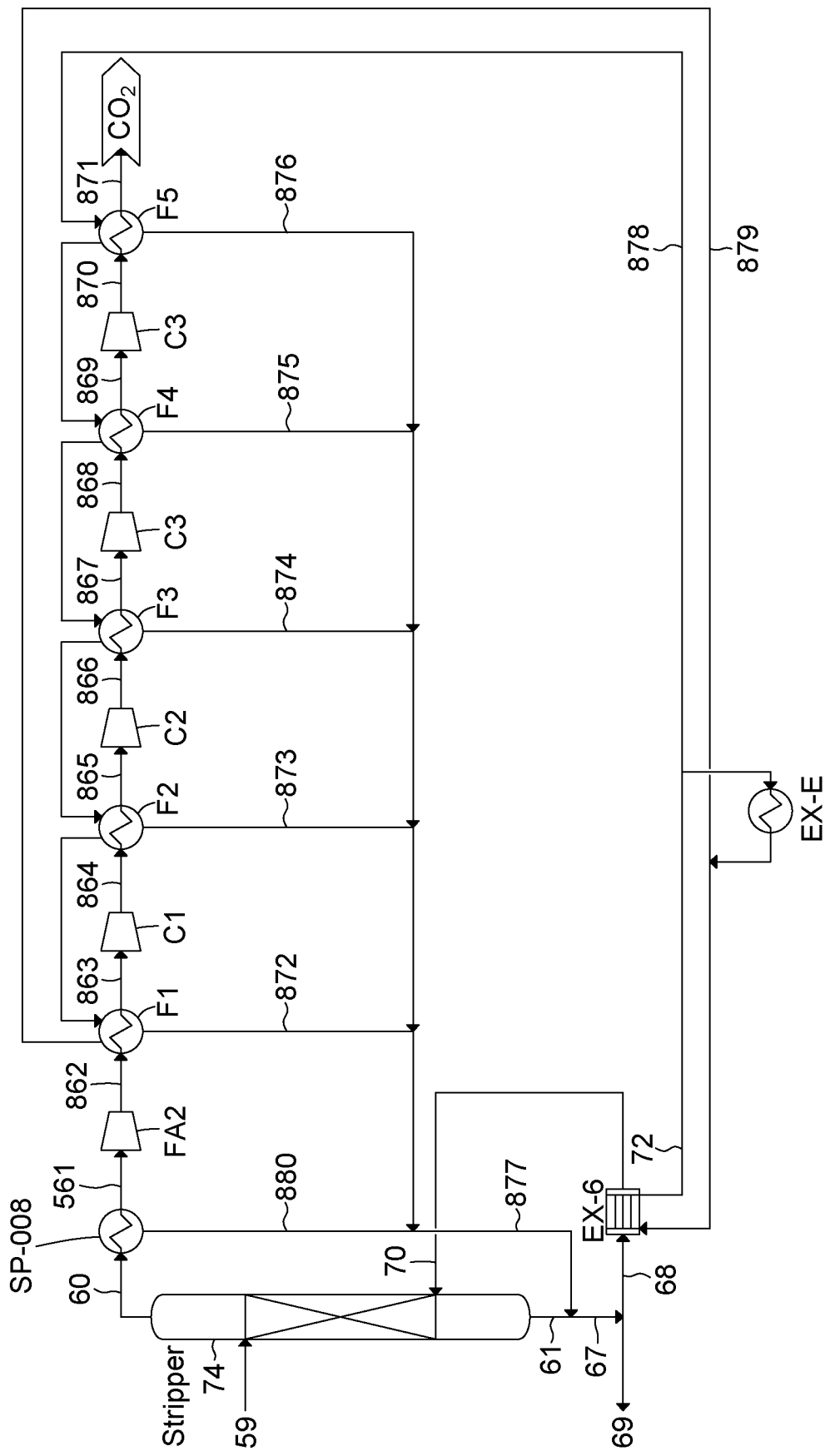
FIG. 8: Process diagram of a 1250 tpd $CO_2$ capture unit delivering the $CO_2$ product at a pressure of 157 bars recovering the energy from the compression stages to supply part of the reboiler thermal energy requirement.

In this process configuration, shown in FIG. 8, the final $CO_2$ product is compressed at a pressure of 15 700 kPa. The $CO_2$/steam gas leaving stripper (60) is first sent to a cooling unit (SP-008) where its temperature is decreased from 63 to 40° C. The vacuum is applied using a vacuum fan (FA-2). The condensed water is recovered and sent back to the process (880). The gas leaving the cooling unit flows through the vacuum fan (FA-2) where it is first compressed and then is cooled down through a cooling unit (F1). Then the gas undergoes 4 compression stages as illustrated in FIG. 8, until it exits the process at a pressure of 15 700 kPa and a temperature of 40° C. The gas temperature at the entrance of each compression stage is set at 40° C. The gas leaving the process is 99.8% (v/v) $CO_2$ and 0.2% (v/v) $H_2O$. Pressures and temperatures of the gas phase for each compression/cooling stages are provided in Table 1. The water condensed at each compression stages (streams 872, 873, 874, 875 and 876) is sent back to the process via stream (877). Water is used as the heat transfer fluid to recover the heat from the cooling units F1, F2, F3, F4 and F5. Water has its temperature increased from 74.5 to 83° C. No heat is recovered from SP-008 as the temperature of the gas being cooled is lower than 83° C.

TABLE 1

Pressure and temperature data for the $CO_2$/steam stream through the different compression/cooling stages.

| Stream number | Pressure (kPaa) | Temperature (° C.) |
|---|---|---|
| 60 | 30 | 63 |
| 861 | 30 | 40 |
| 862 | 100 | 134 |
| 863 | 100 | 40 |
| 864 | 350 | 136 |
| 865 | 350 | 40 |
| 866 | 1250 | 139 |
| 867 | 1250 | 40 |
| 868 | 4300 | 143 |
| 869 | 4300 | 40 |
| 870 | 15700 | 160 |
| 871 | 15700 | 40 |

The total heat recovered from the compression stages was evaluated to be 6 089 KW. This provides 12.5% of the thermal energy required for the reboiler operation (6 089 KW/48 573 kW×100).

Example 3

$CO_2$ capture process based on the potassium carbonate enzyme absorption solution where heat is recovered from the $CO_2$ compression to 15 700 kPa and from the cooling of the flue gas containing $CO_2$.

Figure 9:
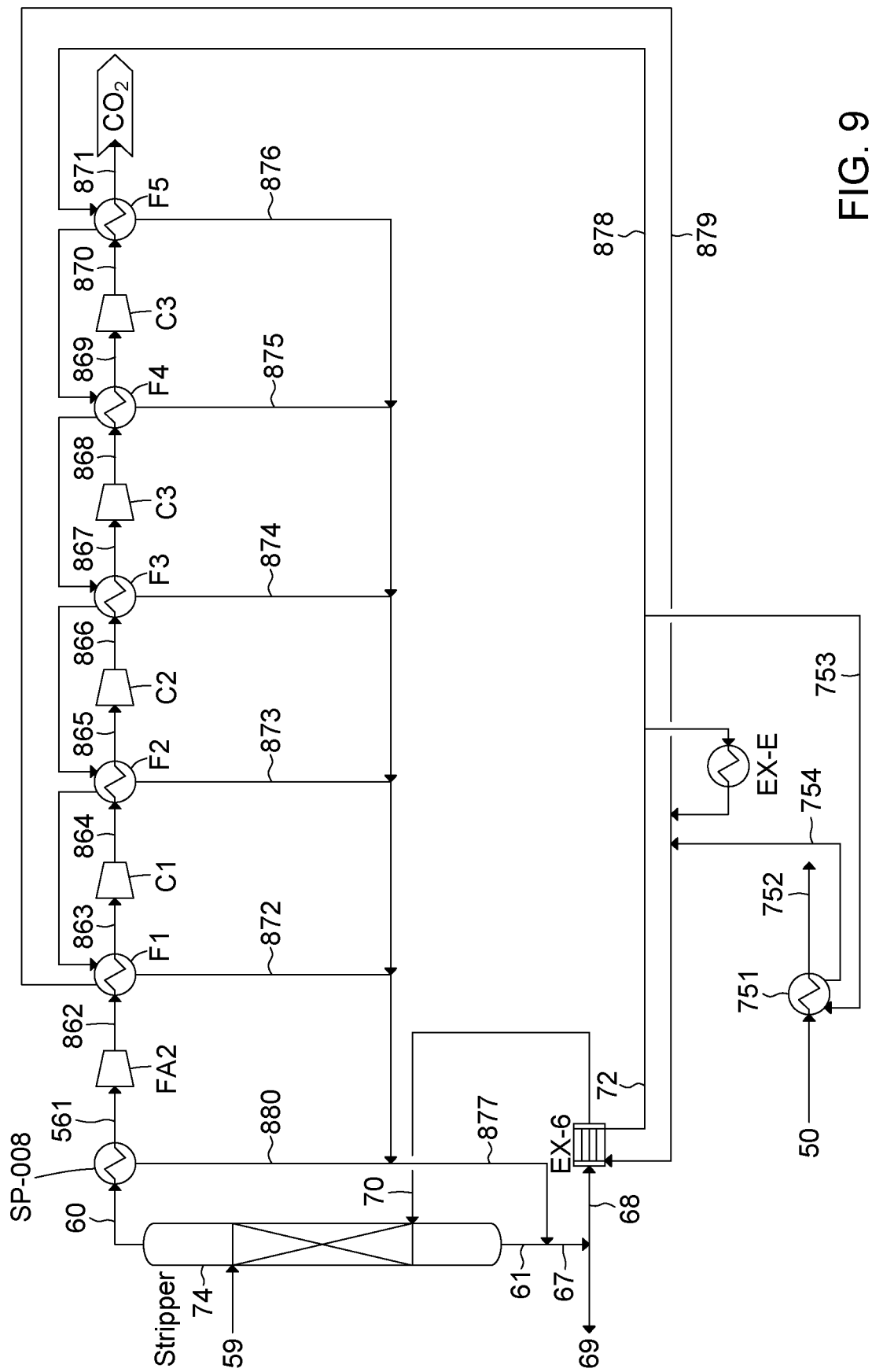
FIG. 9: Process diagram of a 1250 tpd $CO_2$ capture unit delivering the $CO_2$ product at a pressure of 157 bars recovering the energy from the compression stages and the incoming flue gas to supply part of the reboiler thermal energy requirement.

The process of the present example is based on the process described in Examples 1 and 2 and is shown in FIG. 9. In addition to what was previously described, some of the energy of the flue gas is recovered. A heat transfer loop is thus added to the process. For the present example, the heat transfer fluid is water. The heat transfer loop will enable water to have its temperature increased from 74.5 to 83° C. The loop includes in pumping a fraction of the water leaving the reboiler (at a temperature of 74.5° C.) towards a heat exchanger (751) where the flue gas will be cooled down, and water will be heated up. The cooled flue gas is then fed to the quench tower where it is cooled down to a temperature of 30° C. as for the process described in Example 1. Under certain optimal process conditions, the flue gas is cooled from 150° C. to 79° C. and 16 431 KW can be recovered from the flue gas; this accounts for 34% of the reboiler thermal energy requirement.

By combining the heat recovery from the gas compression (Example 2) and from the hot flue gas (Example 3), it is possible to recover 22 520 KW (16431+6089). This corresponds to 46.4% of the reboiler thermal energy requirement. Therefore, the host plant or facility needs to provide less energy to the $CO_2$ capture plant.

Example 4

Process with the addition of a modified overhead vapour compression process to the process of Example 3.

Figure 10:
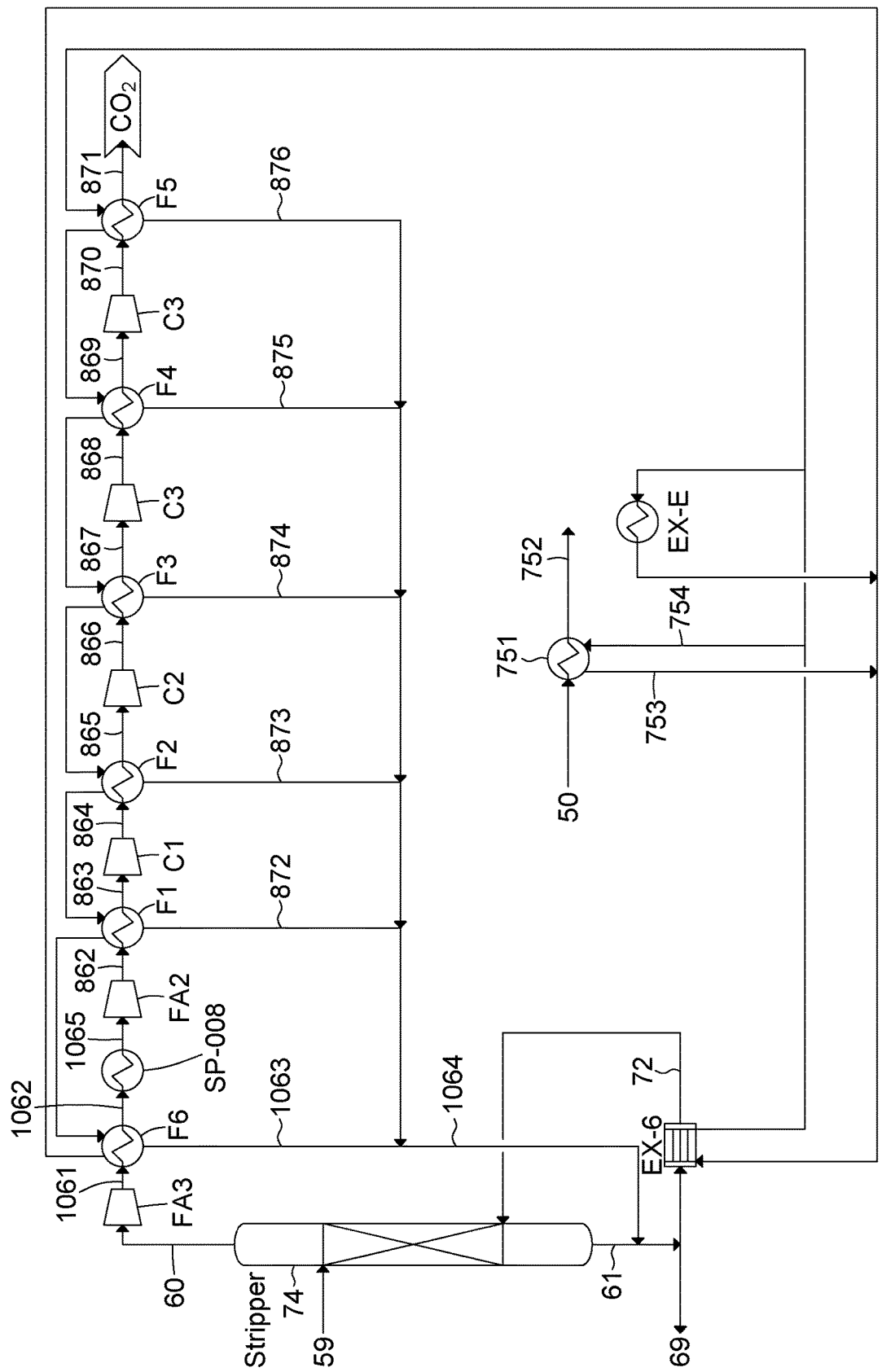
FIG. 10: Process diagram of a 1250 tpd $CO_2$ capture unit delivering the $CO_2$ product at a pressure of 157 bars and equipped with an overhead vapour compression unit and recovering the energy from the compression stages, the overhead vapour compression unit and the incoming flue gas to supply part of the reboiler thermal energy requirement.

For the $CO_2$ capture process described in Example 3, the $CO_2$ gas is compressed to 15 700 kPa. To fulfill part of the thermal energy requirement of the reboiler, the energy is recovered using 2 heat recovery loops using water as the heat transfer fluid. A first loop recovers energy from the compression train increasing the $CO_2$ pressure from 30 kPa to 15 700 kPa. The second loop recovers a fraction of the energy present in the flue gas containing $CO_2$ by cooling the gas from 150° C. to 79° C. In this example, the gas exiting the stripper is sent to an overhead compression stage before entering the compression stages described in Example 2. A simplified diagram of this configuration is shown in FIG. 10. A compression ratio of 3 was adopted for the overhead compression stage. The pressure and temperature conditions of the gas through the overhead compression stage (1 stage) and the 4 compression/cooling stages are presented in Table 2. The gas temperature at the entrance of each compression/cooling stage is 40° C.

TABLE 2

Pressure and temperature data for the $CO_2$/steam stream through the overhead compression stage and the 4 compression/cooling stages. Gas temperature entering the first compression stage is 40° C.

| Stream number | Pressure (kPaa) | Temperature (° C.) |
|---|---|---|
| 60 | 30 | 65 |
| 1061 | 91 | 165 |
| 1062 | 91 | 80 |
| 1065 | 91 | 40 |
| 862 | 273 | 123 |
| 863 | 273 | 40 |
| 864 | 819 | 124 |
| 865 | 819 | 40 |
| 866 | 2457 | 127 |
| 867 | 2457 | 40 |
| 868 | 7371 | 136 |
| 869 | 7371 | 40 |
| 870 | 15700 | 100 |
| 871 | 15700 | 40 |

Under this process configuration, OVC of the overhead stripper stream provides 24 151 KW, the subsequent compression stages provide 3 907 kW and the flue gas provides 16 431 kW. By adding the overhead vapour compression stage, 92% of the thermal energy required for the reboiler is supplied by the $CO_2$ capture process itself. Only 8% of the thermal energy requirement would be provided by using waste heat streams from the host plant.

Example 5

Example 5 includes the addition of an overhead vapour compression process to the process of Example 3 with a gas being cooled at 80° C. instead of 40° C. before the different compression stages. The process configuration is the one of FIG. 10, however, in this case, the cooling unit SP-008 is removed as stream 1065. Table 3 provides temperature and pressure conditions for gas stream entering the compression stages.

TABLE 3

Pressure and temperature data for the $CO_2$/steam stream through the overhead compression stage and the 4 compression/cooling stages. Gas temperature entering the first compression stage is 80° C.

| Stream number | Pressure (kPaa) | Temperature (° C.) |
|---|---|---|
| 60 | 30 | 65 |
| 1061 | 91 | 164 |
| 1062 | 91 | 80 |
| 862 | 273 | 178 |

TABLE 3-continued

Pressure and temperature data for the $CO_2$/steam stream through the overhead compression stage and the 4 compression/cooling stages. Gas temperature entering the first compression stage is 80° C.

| Stream number | Pressure (kPaa) | Temperature (° C.) |
|---|---|---|
| 863 | 273 | 40 |
| 864 | 819 | 124 |
| 865 | 819 | 40 |
| 866 | 2457 | 127 |
| 867 | 2457 | 40 |
| 868 | 7371 | 136 |
| 869 | 7371 | 40 |
| 870 | 15700 | 101 |
| 871 | 15700 | 40 |

Under this process configuration, the fact that the gas temperature is kept at 80° C. instead of 40° C. at the entrance of the first compression unit (after the overhead vapour compression unit) enables recovering an additional 10 973 KW over the case described in Example 4. By doing this, the overhead vapour compression, in combination to the compression stages, enables covering 122% of the reboiler thermal energy requirement. The thermal energy required to be provided by using waste heat streams from the host plant would be nil. This provides the $CO_2$ capture technology a considerable advantage over conventional $CO_2$ capture methods which would not have access to this waste heat.

When an excess of heat is recovered compared to the reboiler's requirements, it is also possible to transfer the excess heat to other equipment of the $CO_2$ capture operation and/or the host facility to preheat various streams having a lower temperature than the heat transfer fluid.

The invention claimed is:

1. A $CO_2$ capture process for capturing $CO_2$ from flue gas generated by a host facility, the process comprising:
   in an absorption stage, directly contacting a flue gas stream with an absorption solution comprising water, potassium carbonate, and a biocatalyst that is free in solution and represented by a carbonic anhydrase to absorb $CO_2$ and form a $CO_2$-rich solution and a $CO_2$ depleted gas;
   in a stripping stage, subjecting the $CO_2$-rich solution to vacuum pressure conditions and temperature conditions below 100° C. to cause the release of $CO_2$ from the $CO_2$-rich solution to form a regenerated solution and an overhead gas stream comprising $CO_2$ and steam;
   recycling the regenerated solution back into the absorption stage as at least part of the absorption solution;
   subjecting the overhead gas stream to heat recovery, comprising:
      compressing the overhead gas stream or a gas stream derived therefrom to increase a temperature thereof and produce a compressed gas stream;
      transferring heat from the compressed gas stream to a heat transfer fluid to form a heated fluid, the transferring comprising condensing water contained in the compressed gas stream; and
      transferring heat from the heated fluid to the stripping stage,
      wherein the transferring heat from the compressed gas stream to the heat transfer fluid and/or the transferring heat from the heated fluid to the stripping stage is performed by indirect heat exchange;
   removing the condensed water from the compressed gas stream;
   recycling the condensed water back into the regenerated solution to produce an aqueous regenerated solution;
   feeding a first portion of the aqueous regenerated solution back into the absorption solution for said recycling the regenerated solution;
   heating a second portion of the aqueous regenerated solution to generate a vaporized regeneration solution; and
   recycling the vaporized regeneration solution into the stripping stage.

2. The $CO_2$ capture process of claim 1, further comprising subjecting at least a portion of the flue gas generated by the host facility to heat recovery and transferring the recovered heat to the stripping stage.

3. The $CO_2$ capture process of claim 2, wherein the portion of the flue gas is the flue gas stream supplied to the absorption stage.

4. The $CO_2$ capture process of claim 2, further comprising:
   providing a first portion of the heat transfer fluid for heat recovery from the overhead gas stream;
   providing a second portion of the heat transfer fluid for heat recovery from the flue gas;
   combining the first and second portions of the heat transfer fluid after heating to form a combined heated fluid; and
   supplying the combined heated fluid to the stripping stage for transferring heat thereto.

5. The $CO_2$ capture process of claim 4, further comprising:
   providing a third portion of the heat transfer fluid for heat recovery from a heat source provided by the host facility;
   combining the third portion of the heat transfer fluid with the first and second portions after heating to form the combined heated fluid; and
   supplying the combined heated fluid to the stripping stage for transferring heat thereto.

6. The $CO_2$ capture process of claim 1, wherein subjecting the overhead gas stream to heat recovery comprises:
   subjecting the overhead gas stream to multiple compression stages arranged in series to produce respective compressed gas streams; and
   for each of the compressed gas streams, indirectly transferring heat from the corresponding compressed gas stream to the heat transfer fluid to enable progressive heating thereof to produce the heated fluid.

7. The $CO_2$ capture process of claim 1, wherein the absorption solution further comprises at least one promoter, catalyst, or biocatalyst in addition to the biocatalyst represented by carbonic anhydrase.

8. The $CO_2$ capture process of claim 7, wherein the promoter, catalyst, or biocatalyst is selected from piperazine, diethanolamine (DEA), diisopropanolamine (DIPA), methylaminopropylamine (MAPA), 3-aminopropanol (AP), 2,2-dimethyl-1,3-propanediamine (DMPDA), diglycolamine (DGA), 2-amino-2-methylpropanol (AMP), 1-amino-2-propanol (MIPA), 2-methyl-methanolamine (MMEA), piperidine (PE), arsenite, hypochlorite, sulphite, glycine, sarcosine, alanine N secondary butyl glycine, pipecolinic acid, and a combination thereof.

9. The $CO_2$ capture process of claim 1, wherein the biocatalyst represented by carbonic anhydrase catalyzes hydration of $CO_2$ to form bicarbonate and hydrogen ions in the absorption stage, and optionally catalyzes dehydration of the ions to form $CO_2$ in the stripping stage.

10. The $CO_2$ capture process of claim 1, wherein transferring heat from the heated fluid to the stripping stage comprises transferring heat to a reboiler of the stripping stage.

11. The $CO_2$ capture process of claim 1, further comprising, after transferring heat from the compressed gas stream to the heat transfer fluid, subjecting the resulting gas stream to further cooling prior to subsequent compression and heat transfer.

12. The $CO_2$ capture process of claim 1, wherein the overhead gas stream is subjected to compression directly after being released from the stripping stage.

13. The $CO_2$ capture process of claim 1, wherein all of the overhead gas stream released from the stripping stage is subjected to the heat recovery.

14. The $CO_2$ capture process of claim 1, wherein transferring heat from the heated fluid to the stripping stage comprises transferring heat from the heated fluid at a temperature lower than that of the compressed gas stream.

* * * * *